(12) United States Patent
Newman et al.

(10) Patent No.: US 12,595,763 B2
(45) Date of Patent: Apr. 7, 2026

(54) GAS TURBINE ENGINE HYDRAULIC SYSTEM

(71) Applicant: ROLLS-ROYCE plc, London (GB)

(72) Inventors: Adam Newman, Derby (GB); Chloe J. Palmer, Derby (GB); Benjamin J Keeler, Derby (GB); Richard A Scott, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 19/096,780

(22) Filed: Apr. 1, 2025

(65) Prior Publication Data

US 2025/0327423 A1 Oct. 23, 2025

(30) Foreign Application Priority Data

Apr. 18, 2024 (GB) ..................................... 2405429

(51) Int. Cl.
| | |
|---|---|
| *F02C 7/224* | (2006.01) |
| *F02C 3/22* | (2006.01) |
| *F02C 6/00* | (2006.01) |
| *F02C 7/16* | (2006.01) |
| *F02C 7/22* | (2006.01) |

(52) U.S. Cl.
CPC ............... *F02C 7/224* (2013.01); *F02C 6/00* (2013.01); *F02C 7/16* (2013.01); *F02C 7/22* (2013.01); *F02C 3/22* (2013.01)

(58) Field of Classification Search
CPC .... F02C 7/16; F02C 7/22; F02C 7/224; F02C 6/00; F02C 3/22; F02C 7/06; F02C 7/12; F02C 7/14; F02C 3/20; F02C 3/24; F02C 9/26; F02C 9/40; F05D 2260/213
See application file for complete search history.

(56) References Cited

U.S. PATENT DOCUMENTS

| | | | | |
|---|---|---|---|---|
| 3,779,007 | A * | 12/1973 | Lavash ..................... | F02C 7/14 |
| | | | | 60/39.83 |
| 4,041,697 | A * | 8/1977 | Coffinberry ............... | F02C 7/14 |
| | | | | 60/39.83 |
| 4,104,873 | A * | 8/1978 | Coffinberry ............... | F02C 7/14 |
| | | | | 60/39.83 |
| 7,997,062 | B2 * | 8/2011 | Sun .......................... | F01D 25/18 |
| | | | | 60/734 |
| 10,100,748 | B2 | 10/2018 | Kawai et al. | |
| 11,920,514 | B1 * | 3/2024 | Bemment ................. | F02C 7/14 |
| 11,982,234 | B1 * | 5/2024 | Mohammed .......... | F16K 17/383 |
| 11,994,072 | B1 * | 5/2024 | Bemment ................. | F02C 6/08 |
| 12,071,894 | B2 * | 8/2024 | Bemment ............... | F01D 15/10 |
| 12,196,133 | B1 * | 1/2025 | Minelli .................... | F02C 7/224 |
| 12,241,415 | B1 * | 3/2025 | Keeler ...................... | F02C 7/06 |
| 12,241,421 | B1 * | 3/2025 | Minelli .................... | F02C 7/36 |

(Continued)

FOREIGN PATENT DOCUMENTS

FR 3 134 850 A1 10/2023

*Primary Examiner* — William H Rodriguez
(74) *Attorney, Agent, or Firm* — Oliff PLC

(57) ABSTRACT

A hydraulic system for a hydrogen fueled gas turbine engine. The hydraulic system comprises a closed-loop hydraulic fluid conduit, a hydrogen-hydraulic fluid heat exchanger configured to exchange heat between cryogenic hydrogen fuel and hydraulic fluid within the hydraulic fluid conduit, and a second fuel-hydraulic heat exchanger configured to exchange heat between a second, non-hydrogen fuel and hydraulic fluid in the hydraulic fluid conduit.

16 Claims, 6 Drawing Sheets

(56)                  References Cited

U.S. PATENT DOCUMENTS

| | | | |
|---|---|---|---|
| 12,270,342 B1 * | 4/2025 | Rambo | F02C 7/14 |
| 12,281,614 B1 * | 4/2025 | Minelli | F02C 9/40 |
| 12,320,298 B2 * | 6/2025 | Bemment | F02C 7/10 |
| 12,365,477 B1 * | 7/2025 | Willmot | F02C 3/22 |
| 2007/0277528 A1 * | 12/2007 | Homitz | F23D 14/58 |
| | | | 60/737 |
| 2016/0138473 A1 * | 5/2016 | Veilleux, Jr. | F02C 7/22 |
| | | | 137/59 |
| 2016/0281656 A1 * | 9/2016 | Alecu | F02C 7/236 |
| 2023/0010158 A1 * | 1/2023 | Muldoon | B64D 37/30 |
| 2023/0040971 A1 * | 2/2023 | Smith | F02C 7/185 |
| 2023/0193835 A1 * | 6/2023 | Swann | F02C 7/22 |
| 2023/0243308 A1 | 8/2023 | Jouan et al. | |
| 2023/0332543 A1 * | 10/2023 | Bemment | F02C 7/36 |
| 2023/0391467 A1 * | 12/2023 | Palmer | F02C 7/22 |
| 2024/0209779 A1 * | 6/2024 | Bemment | F01D 17/085 |
| 2024/0209785 A1 * | 6/2024 | Bemment | F23R 3/005 |
| 2024/0209787 A1 * | 6/2024 | Bemment | F02C 7/224 |
| 2024/0209789 A1 * | 6/2024 | Bemment | F02C 7/32 |
| 2024/0246693 A1 * | 7/2024 | Rush | F02C 7/224 |
| 2024/0287937 A1 * | 8/2024 | Bemment | F23R 3/005 |
| 2024/0301828 A1 * | 9/2024 | Bemment | F01D 25/125 |
| 2024/0301829 A1 * | 9/2024 | Bemment | F02C 7/14 |
| 2024/0318600 A1 * | 9/2024 | Bemment | F23R 3/28 |
| 2025/0154894 A1 * | 5/2025 | Willmot | F02C 3/22 |
| 2025/0154902 A1 * | 5/2025 | Willmot | H01M 8/04201 |
| 2025/0188869 A1 * | 6/2025 | Palmer | F02C 3/22 |
| 2025/0198335 A1 * | 6/2025 | Keeler | F02C 7/06 |
| 2025/0198351 A1 * | 6/2025 | Minelli | F02C 7/224 |
| 2025/0198353 A1 * | 6/2025 | Keeler | F02C 7/232 |
| 2025/0304275 A1 * | 10/2025 | Miller | F02C 7/224 |
| 2025/0369391 A1 * | 12/2025 | Gernone | F02C 7/14 |

* cited by examiner

GAS TURBINE ENGINE HYDRAULIC SYSTEM

TECHNICAL FIELD

This disclosure relates to a hydraulic system for a hydrogen fueled gas turbine engine, an engine incorporating such a hydraulic system, and methods of operating such a hydraulic system.

BACKGROUND

In order to limit emissions of carbon dioxide, use of hydrogen as an alternative to hydrocarbon fuel in gas turbine engines has historically only been practical in land-based installations. However, more recently there has been interest in aircraft powered by hydrogen stored at cryogenic temperatures, as either a compressed gas, a supercritical fluid, or a liquid.

Challenges of operating such gas turbine engines include managing temperatures of the cryogenically cooled hydrogen and other engine fluids, as well as controlling actuators within the engine. Conventional gas turbine engines use fuel for various actuation and control purposes. Since neither cryogenic liquid hydrogen, nor gaseous hydrogen are suitable for such purposes, in view of its low temperature as a liquid and its compressibility as a gas, a different system must be designed for hydrogen fueled gas turbine engines.

In some cases, it may be desirable to use alternative fuels such as kerosene and/or methane in addition to hydrogen, for example due to lack of availability or insufficient performance with hydrogen fuel. Such "dual-fuel" fuel systems are inherently complex, and present additional safety issues.

SUMMARY

In a first aspect there is provided a hydraulic system for a hydrogen fueled gas turbine engine, the hydraulic system comprising:
    a closed-loop hydraulic fluid conduit;
    a first heat exchanger configured to exchange heat between hydrogen fuel and hydraulic fluid within the hydraulic fluid conduit; and
    a further heat exchanger configured to exchange heat between the hydraulic fluid and one or more further engine fluids.

Advantageously, each of hydrogen fuel, hydraulic fluid and further engine fluid temperatures can be managed with a single hydrogen fuel heat exchanger. Such hydrogen fuel heat exchangers are complex and difficult to manufacture in view of the risk of hydrogen fuel leaks. As such, producing a system with a single hydrogen fuel heat exchanger has significant safety, weight and cost advantages.

The hydraulic system may comprise a hydraulic pump configured to pressurise and drive hydraulic fluid flow through the hydraulic fluid conduit.

The hydraulic pump may be provided upstream in hydraulic fluid flow of the first heat exchanger. The hydraulic pump may be configured to provide a total hydraulic fluid pressure within the first heat exchanger equal to or greater than a hydrogen fuel pressure within the first heat exchanger. Advantageously, any leak in the heat exchanger at the interface between the hydraulic fluid and hydrogen fuel will result in a leak of hydraulic fluid into the engine fuel, rather than hydrogen fuel into the hydraulic system. Accordingly, the risk of fires, hydrogen leaks within the hydraulic system, and hydraulic system overpressure events are reduced.

The hydraulic system may comprise one or more hydraulically actuated actuators.

The hydraulic system may comprise a restrictor downstream in hydraulic fluid flow of the first heat exchanger, and upstream of the further heat exchanger. Advantageously, the hydraulic fluid can be pressurised at a high pressure for the first heat exchanger, and at a lower pressure for the further heat exchanger. Accordingly, further heat exchanger weight and cost can be reduced.

The restrictor may be upstream of one or more components cooled by hydraulic fluid. By reducing hydraulic fluid pressure for the hydraulic fluid cooled components, the risk of damage to these components can be reduced. The hydraulic fluid cooled components may comprise one or more electric machines such as one or more electrical generators, and may comprise one or more power electronics modules.

The hydraulic system may comprise a high-pressure sub-loop upstream of the restrictor, and configured to provide hydraulic actuation fluid to one or more hydraulic actuators. Accordingly, high-pressure actuators can be utilised, which reduces the size and weight of the actuators.

The hydraulic system may comprise a high-pressure hydraulic accumulator configured to provide hydraulic fluid to the high-pressure sub-loop and to the restrictor.

The hydraulic system may comprise a spill-valve configured to control hydraulic fluid flow between the high-pressure sub-loop and the restrictor.

The further heat exchanger may be configured to exchange heat between hydraulic fluid and primary engine cooling fluid such as oil.

The hydraulic system may comprise a second fuel-hydraulic heat exchanger configured to exchange heat between a second, non-hydrogen fuel and hydraulic fluid in the hydraulic fluid conduit.

According to a second aspect there is provided a gas turbine engine comprising a hydraulic system in accordance with the first aspect.

According to a third aspect there is provided a method of operating a hydraulic system for a hydrogen fueled gas turbine engine, the method comprising:
    pumping a hydraulic fluid through a first heat exchanger to exchange heat between hydrogen fuel and hydraulic fluid within a hydraulic fluid conduit; and
    pumping hydraulic fluid through a further heat exchanger to exchange heat between the hydraulic fluid and one or more further engine fluids.

According to a fourth aspect there is provided a hydraulic system for a hydrogen fueled gas turbine engine, the hydraulic system comprising:
    a closed-loop hydraulic fluid conduit;
    a hydrogen-hydraulic fluid heat exchanger configured to exchange heat between hydrogen fuel and hydraulic fluid within the hydraulic fluid conduit; and
    a second fuel-hydraulic heat exchanger configured to exchange heat between a second, non-hydrogen fuel and hydraulic fluid in the hydraulic fluid conduit.

Advantageously, hydraulic fluid cooling and fuel heating can be provided irrespective of which fuel is selected in dual or triple-fuel aircraft architecture.

The hydraulic system may comprise a third fuel-hydraulic heat exchanger configured to exchange heat between a third, non-hydrogen fuel and hydraulic fluid in the hydraulic fluid conduit.

The second and/or third fuel may comprise a hydrocarbon fuel such as kerosene and/or methane.

The hydrogen-hydraulic fluid heat exchanger and second fuel-hydraulic and optional third fuel-hydraulic heat exchangers may be provided in hydraulic fluid flow series or in parallel. Advantageously, transfer of heat between the hydraulic fluid and a different fuel can be provided for automatically, without active actuation in the hydraulic system.

The hydraulic system may comprise first and/or second fuel-hydraulic bypass lines configured to selectively bypass hydraulic fluid around a respective fuel-hydraulic heat exchanger. Alternatively or in addition, the fuel system may comprise a first and/or second fuel bypass line configured to selectively bypass fuel around a respective fuel-hydraulic heat exchanger. Advantageously, heat exchange can be controlled by selective bypass of the fuel-hydraulic heat exchangers.

The hydraulic system may comprise a further heat exchanger configured to exchange heat between the hydraulic fluid and one or more further engine fluids.

The hydraulic system may comprises a hydraulic pump configured to pressurise and drive hydraulic fluid flow through the hydraulic fluid conduit.

The hydraulic pump may be provided upstream in fluid flow of the hydrogen-hydraulic fluid heat exchanger.

The hydraulic pump may be configured to provide a total hydraulic fluid pressure within the hydrogen-hydraulic fluid heat exchanger equal to or greater than a hydrogen fuel pressure within the hydrogen-fuel heat exchanger.

The hydraulic system may comprise one or more hydraulically actuated actuators.

The hydraulic system may comprise a restrictor downstream in hydraulic fluid flow of the hydrogen-hydraulic fluid heat exchanger, and upstream of the further heat exchanger.

The restrictor may be upstream of one or more components cooled by hydraulic fluid.

The hydraulic system may comprise a high-pressure sub-loop upstream of the restrictor, and configured to provide hydraulic actuation fluid to one or more hydraulic actuators.

The hydraulic system may comprise a high-pressure hydraulic accumulator configured to provide hydraulic fluid to the high-pressure sub-loop and to the restrictor.

The further heat exchanger may be configured to exchange heat between hydraulic fluid and oil.

BRIEF DESCRIPTION OF THE DRAWINGS

An embodiment will now be described by way of example only with reference to the accompanying drawings, which are purely schematic and not to scale, and in which.

DETAILED DESCRIPTION

Figure 1:
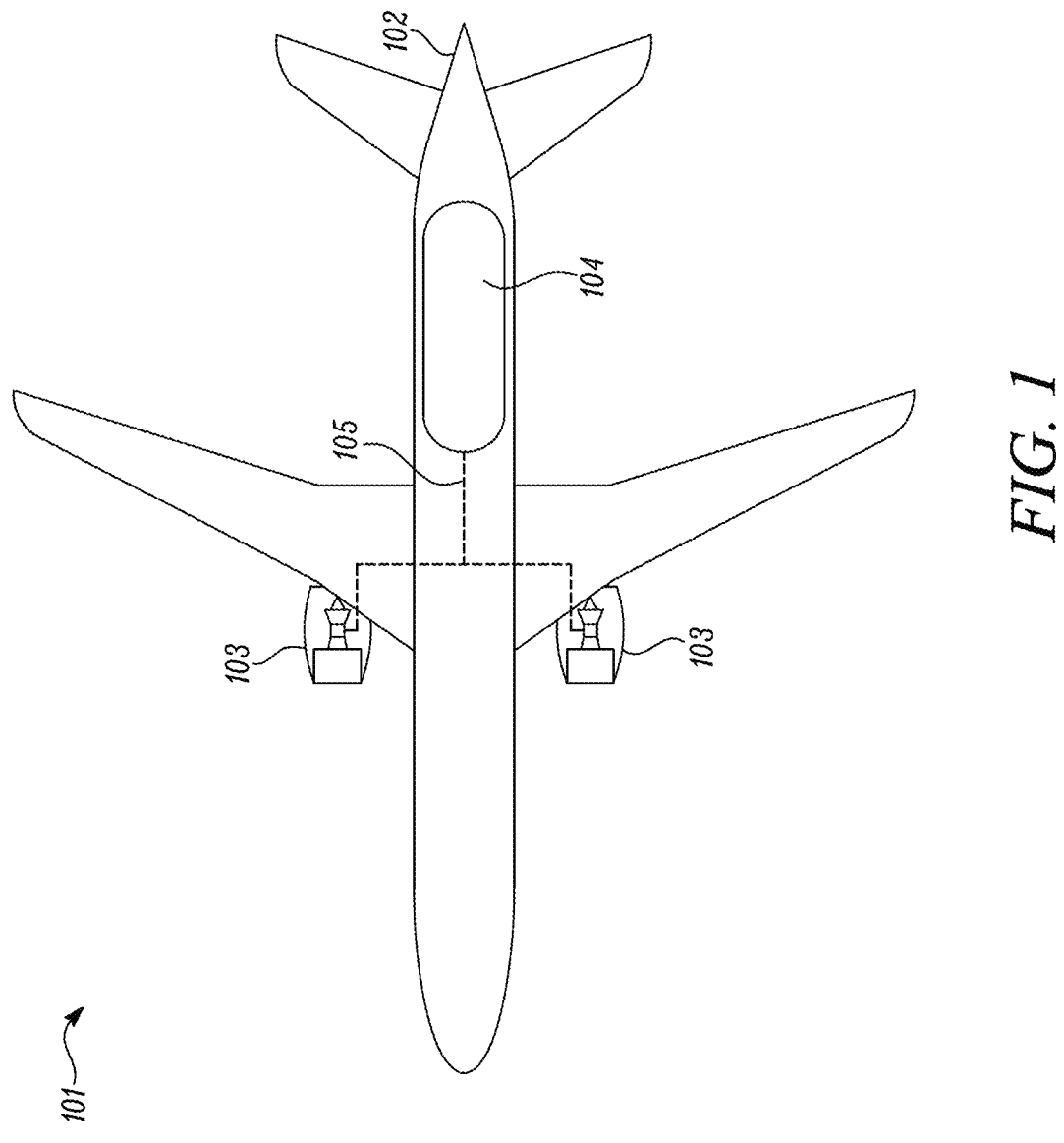
FIG. 1 shows a hydrogen-fueled airliner comprising a propulsion system comprising hydrogen-fueled turbofan engines.

A hydrogen-fueled airliner is illustrated in FIG. 1. In this example, the airliner 101 is of substantially conventional tube-and-wing twinjet configuration with a central fuselage 102 and a propulsion system comprising substantially identical underwing-mounted turbofan engines 103.

A hydrogen storage tank 104 is located in the fuselage 102. The hydrogen storage tank 104 is a cryogenic hydrogen storage tank and thus stores the hydrogen fuel in a liquid state, in a specific example at 22 Kelvin. In this example, the hydrogen fuel is pressurised to a pressure from around 1 bar to around 4 bar, in a specific example 4 bar. As will be appreciated, storing the hydrogen fuel at a higher pressure would necessitate heavier tanks to contain the pressure, and increase the risk of leaks. On the other hand, a lower pressure would reduce the boiling point of the hydrogen, requiring a lower temperature in the tank, and would risk cavitation and or two-phase flow in downstream hydrogen plumbing.

In alternative embodiments, the hydrogen may be stored as a compressed or supercritical fluid at high pressures and low temperatures. For example, the hydrogen may be stored at between 22 and 200 Kelvin, and at pressures between 100 and 300 Bar.

Figure 2:
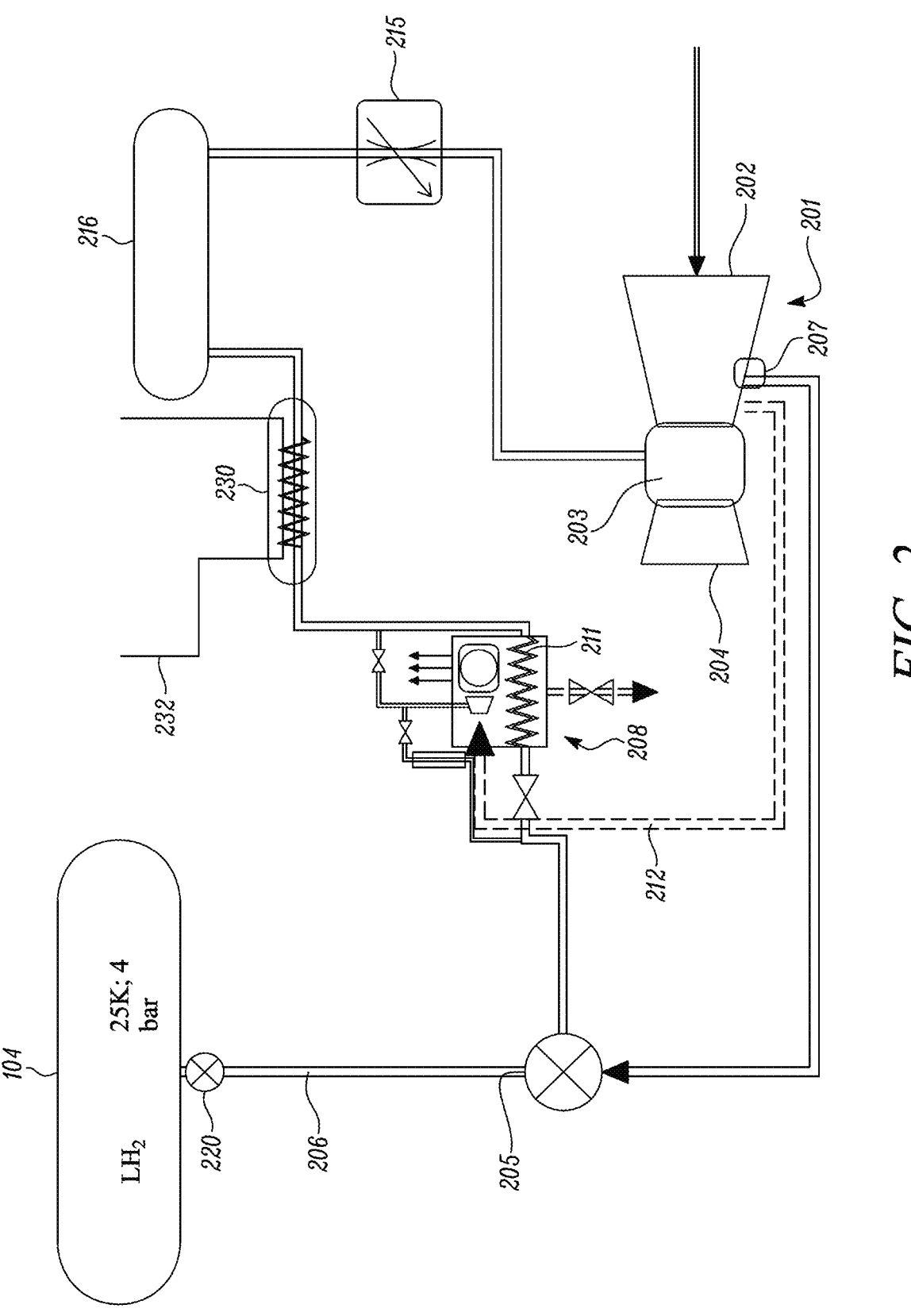
FIG. 2 is a block diagram of a fuel system of the propulsion system of the aircraft of FIG. 1.

A block diagram of one of the propulsion systems comprising one of the engines 103 and its associated fuel system is shown in FIG. 2.

The turbofan engine 103 comprises a core gas turbine 201.

The core gas turbine 201 comprises, in fluid flow series, at least one compressor 202 (and possibly separate low and high-pressure compressors), a core combustor 203 and a turbine system 204 (which typically comprises separate low and high-pressure turbines). The compressor 202 is driven by the turbine 204 via a shaft (not shown), or separate shafts where multiple compressors and turbines are provided. A fan (not shown) is typically provided to provide propulsive thrust in addition to that generated by the engine core. It will be appreciated that in alternative embodiments, the core gas turbine could be of three-shaft configuration, and/or could comprise a reduction gearbox between the turbine and fan.

In operation, hydrogen fuel is pumped from the hydrogen storage tank 104 by one or more pumps 205 and into a main fuel conduit 206 which ultimately delivers fuel to the core combustor 203. In the present embodiment, the pump 205 is driven by an electric machine driven by a main engine provided with electrical power from a main engine driven electrical generator 207. In the present embodiment, the generator 207 is a starter-generator configured to provide both electrical generation and engine starting, but other configurations are envisaged. In other embodiments, the pump 205 may be driven by one or more of the gas turbine engine core shafts via an auxiliary gearbox (not shown). In some cases, a low-pressure pump 220 may also be provided, upstream of the high-pressure pump 205, and may be provided within the liquid hydrogen tank 104.

Where the tank 104 stores liquid hydrogen, the pump 205 is typically configured to pump liquid hydrogen, rather than primarily to pump gaseous or supercritical hydrogen. Where the tank 104 is configured to store gaseous hydrogen, the pump 205 is configured to pump gaseous hydrogen, or is omitted entirely.

As will be appreciated, it is desirable to increase the temperature of the fuel from the 22 Kelvin cryogenic storage condition to a temperature much closer to the firing temperature of the core gas turbine 201; of course, this is subject to the constraint of not exceeding the autoignition temperature of the hydrogen fuel prior to admission into the combustor 207. In an example, the injection temperature is from 250 to 300 kelvin, for example 250 kelvin. In some cases, it may be desirable to increase the fuel temperature to above an icing temperature, such as 273 Kelvin.

In the present embodiment, a pre-heater 208 is therefore provided for heating of the hydrogen fuel, and possibly to implement a phase change. In the present embodiment, this takes place between the pump 205 and the core combustor 203. In an embodiment, the heater 208 is configured to raise the temperature of the hydrogen fuel to the required injection temperature.

The heater 208 comprises an offtake configured to divert a portion of the hydrogen fuel from the main fuel conduit 206. A bleed offtake 212 is provided, which provides high-pressure bleed air to the heater. Hydrogen fuel and bleed air are combusted within the heater 208 to heat hydrogen in the fuel conduit 205 via a pre-heater heat exchanger 211.

Fuel flow through the system between the tank 104 and core combustor 203 is controlled by one or more valves including a Fuel Management Unit (FMU) 215, which actively controls fuel flow rate and pressure delivered to the core combustor 203 in conjunction with operation of the pumps 205. An optional buffer tank 216 may be provided, configured to store hydrogen gas from downstream of the pre-heater 208 to manage transient pressures and flow rates.

A first hydraulic system heat exchanger 230 is provided. the first hydraulic system heat exchanger 230 is in the form of a fuel-hydraulic fluid heat exchanger configured to exchange heat between the relatively cold hydrogen fuel and relatively warm hydraulic fluid within a hydraulic fluid loop conduit 232. The first heat exchanger 230 is provided downstream in hydrogen fuel flow of the pre-heater 208, and upstream of at least the combustor 203 of the gas turbine engine 201. In the present embodiment, the first heat exchanger 230 is also upstream of the FMU 215 and hydrogen accumulator 216. It will be appreciated that in some embodiments, the first heat exchanger may be located upstream in hydrogen fuel flow of the preheater 208, and the preheater 208 may be omitted entirely in some embodiments.

Figure 3:
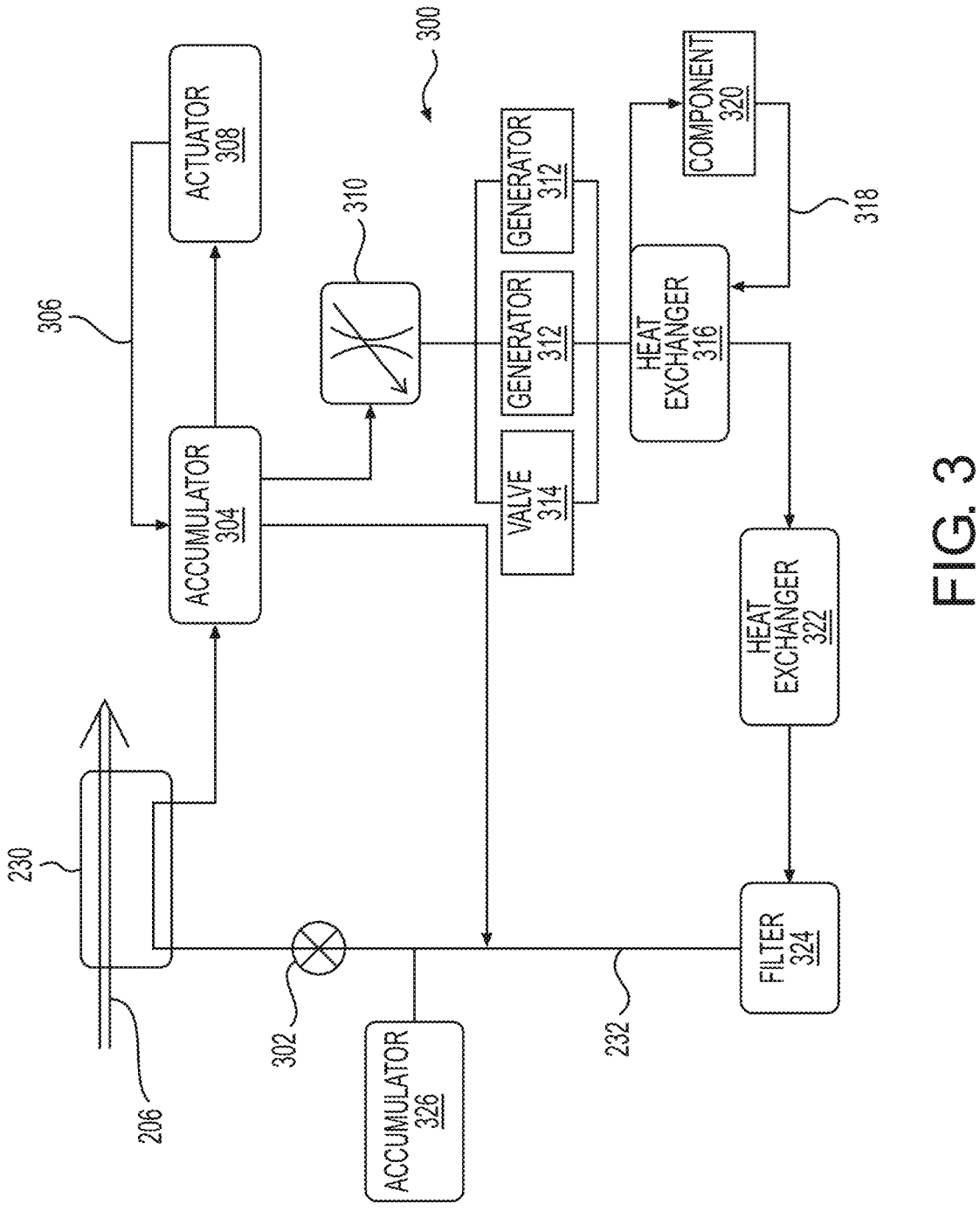
FIG. 3 is a block diagram of a hydraulic system of the propulsion system of the aircraft of FIG. 1.

FIG. 3 shows the hydraulic system 300 in more detail.

The hydraulic system comprises a closed-loop hydraulic fluid conduit 232, which contains hydraulic fluid such as Therminol™, a synthetic heat transfer fluid produced by Eastman Chemical Company. Other suitable hydraulic fluids are known, such as mineral oil derivatives, or any other suitable dielectric incompressible fluid.

The hydraulic system comprises a hydraulic pump 302 configured to pressurise and drive hydraulic fluid through the system. The pump 302 is of conventional construction, and in the present embodiment is configured to provide a pressure of between 1100 and 1300 Pounds per Square Inch Absolute (PSIa).

Immediately downstream of the hydraulic pump 302 is the first heat exchanger 230. As noted above, the first heat exchanger is configured to transfer heat from the hydraulic fluid in the hydraulic fluid conduit 232 to the hydrogen fuel in the fuel conduit 206. As such, the hydraulic fluid is cooled by the first heat exchanger, and also experiences some pressure drop.

The inventors have found that hydrogen fuel leaking into the hydraulic system represents a greater risk than hydraulic fluid leaking into the fuel system. This is because hydrogen leaking into the hydraulic system may cause an overpressure within the system, and lead to damage. Additionally, the lower temperatures and different material properties of hydrogen may lead to damage when in contact with materials that are not designed for it. For instance, hydrogen can lead to embrittlement, and has poorer lubricative properties than hydraulic fluid. Accordingly, hydraulic pump 302 is configured and operated to provide a higher pressure at the hydraulic fluid side of the first heat exchanger 230 than the hydrogen fuel within the heat exchanger 230. Consequently, any leak between the two will result in hydraulic fluid entering the fuel system, with the hydraulic system remaining free of fuel. In some cases, pressure sensors (not shown) in the hydraulic and fuel systems may be provided to ensure that the hydraulic system pressure is greater than the hydrogen fuel system pressure within the heat exchanger 230. In other cases, the hydraulic pump may be operated at all times at a pressure greater than the maximum fuel system pressure.

A first hydraulic accumulator 304 is provided downstream of the first heat exchanger 230. This stores hydraulic fluid and provides a reservoir for fluid for downstream components.

The hydraulic accumulator is in fluid communication with a hydraulic system sub-loop 306, which provides high-pressure hydraulic fluid to one or more hydraulically actuated components. In this example, the hydraulically actuated components comprise at least one Variable Stator Vane Actuator (VSVA) 308 configured to vary airflow angle entering one or more compressor stage of the compressor 202. As will be appreciate, other engine or aircraft hydraulic actuators may be provided.

The sub-loop 306 circulates hydraulic fluid between the accumulator 304 and high-pressure hydraulically actuated components 308 in a continuous loop, partly separated from the main hydraulic system loop.

Downstream of the high-pressure accumulator 304 in the main loop is a pressure reducing device/flow restrictor 310. The restrictor 310 is in the form of a fixed or variable flow area orifice, which serves to permit flow downstream, while reducing pressure. In the present embodiment, the pressure is reduced to between 100 and 200 PSIa. As such, the hydraulic fluid can serve further low-pressure hydraulic systems.

Immediately downstream of the restrictor 310 are one or more hydraulic fluid cooled components. In this embodiment, the hydraulic fluid cooled components comprise a pair of starter generators 312. A spill valve 314 is provided to bypass the hydraulically cooled components to allow for control of cooling rate of the components 312.

Downstream of the hydraulically cooled components is a second hydraulic system heat exchanger 316. The second heat exchanger 316 is configured to exchange heat between hydraulic fluid in the conduit 232 with a further heat transfer fluid. In this embodiment, the further heat transfer fluid comprises oil in an oil system conduit 318 to cool and/or lubricate one or more components 320. As will be appreciated, alternative heat transfer fluids such as water, water/glycol, or air may be utilised in the second heat exchanger. These fluids may be used for de-icing or component cooling, such as provided cooled-cooling air for turbine blades. As such, multiple components can be cooled using multiple fluids while providing only a single heat exchanger that directly exchanges heat with the hydrogen fuel. Since hydrogen fuel is stored at a very low temperature and has a high heat capacity, hydrogen fuel provides a highly efficient heat sink. The inventors have however recognised that hydrogen heat exchangers represent a significant leak risk, in view of the small molecular size of gaseous hydrogen. Furthermore, hydrogen is highly flammable. As such, the heat exchange system of the present disclosure provides a highly efficient solution which has a greater safety factor than alternative arrangements in which multiple hydrogen fuel heat exchangers are provided.

Further heat exchangers 322 may be provided downstream in hydraulic fluid flow of the second heat exchanger 316. For instance, the further heat exchanger 322 could comprise a hydraulic fluid to water heat exchanger 322.

One or more hydraulic fluid filter 324 may be provided downstream of the second and further heat exchanger 316, 322, or may be provided in alternative locations in the hydraulic system.

Finally, a low-pressure hydraulic accumulator 326 is provided immediately upstream of the hydraulic pump 302, to regulate pressure and provide a reservoir of hydraulic fluid for the system. A system pressure of approximately 50 psi may be maintained in the hydraulic accumulator 326, upstream of the hydraulic pump 302.

Figure 4:
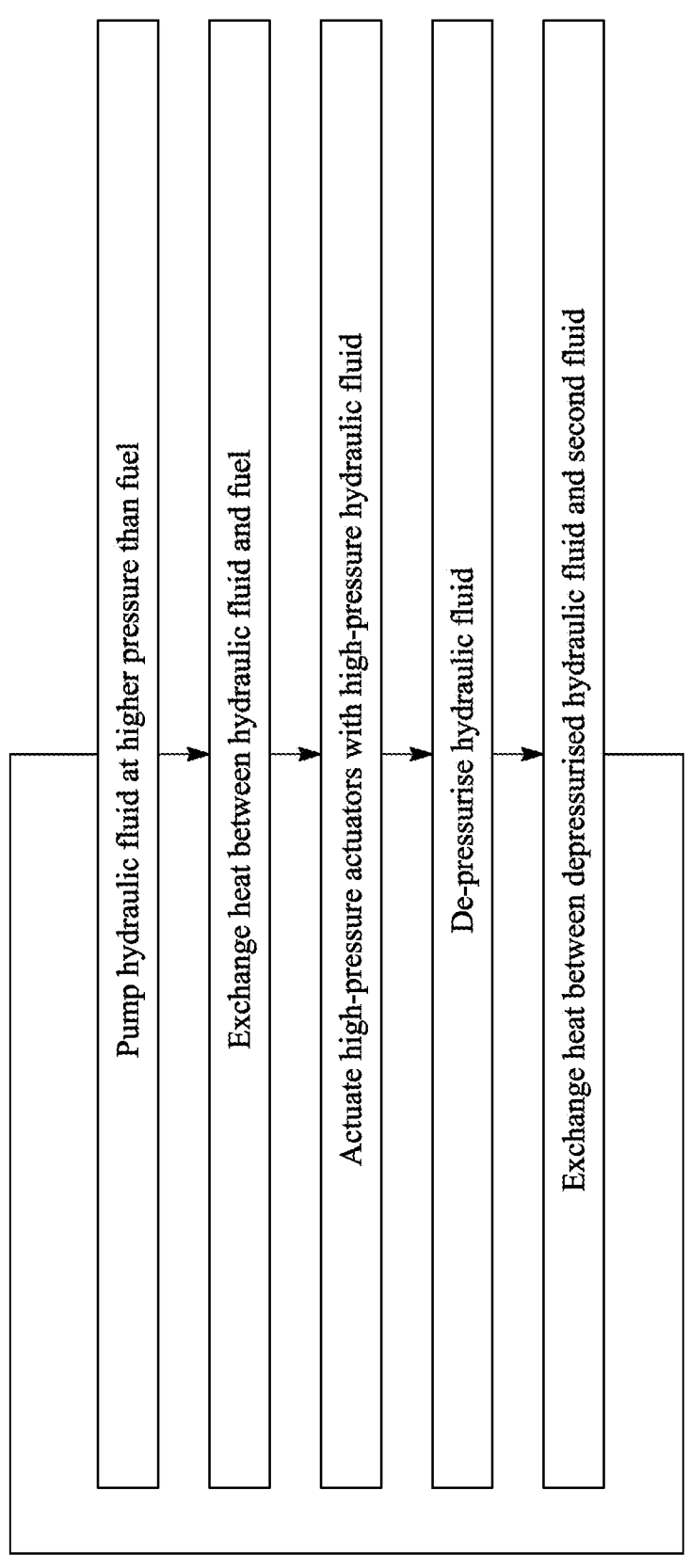
FIG. 4 is a flow diagram illustrating a method of operating the hydraulic system of FIG. 3.

FIG. 4 shows a functional flow diagram illustrating a method of operating the hydraulic system of FIG. 3.

In a first step, hydraulic fluid is pumped by the pump 302 to a high-pressure. The pressure is selected to maintain a hydraulic fluid pressure above a hydrogen fuel pressure.

The hydraulic fluid is then provided to the first heat exchanger 230, wherein the hydrogen fuel is warmed, and the hydraulic fluid is cooled.

The fluid is then provided to high-pressure actuators, before being depressurised.

The depressurised fluid is then provided to the second heat exchanger, where it is heated further. The further heated hydraulic fluid is then provided back to the accumulator 326 or the pump 302.

Figure 5:
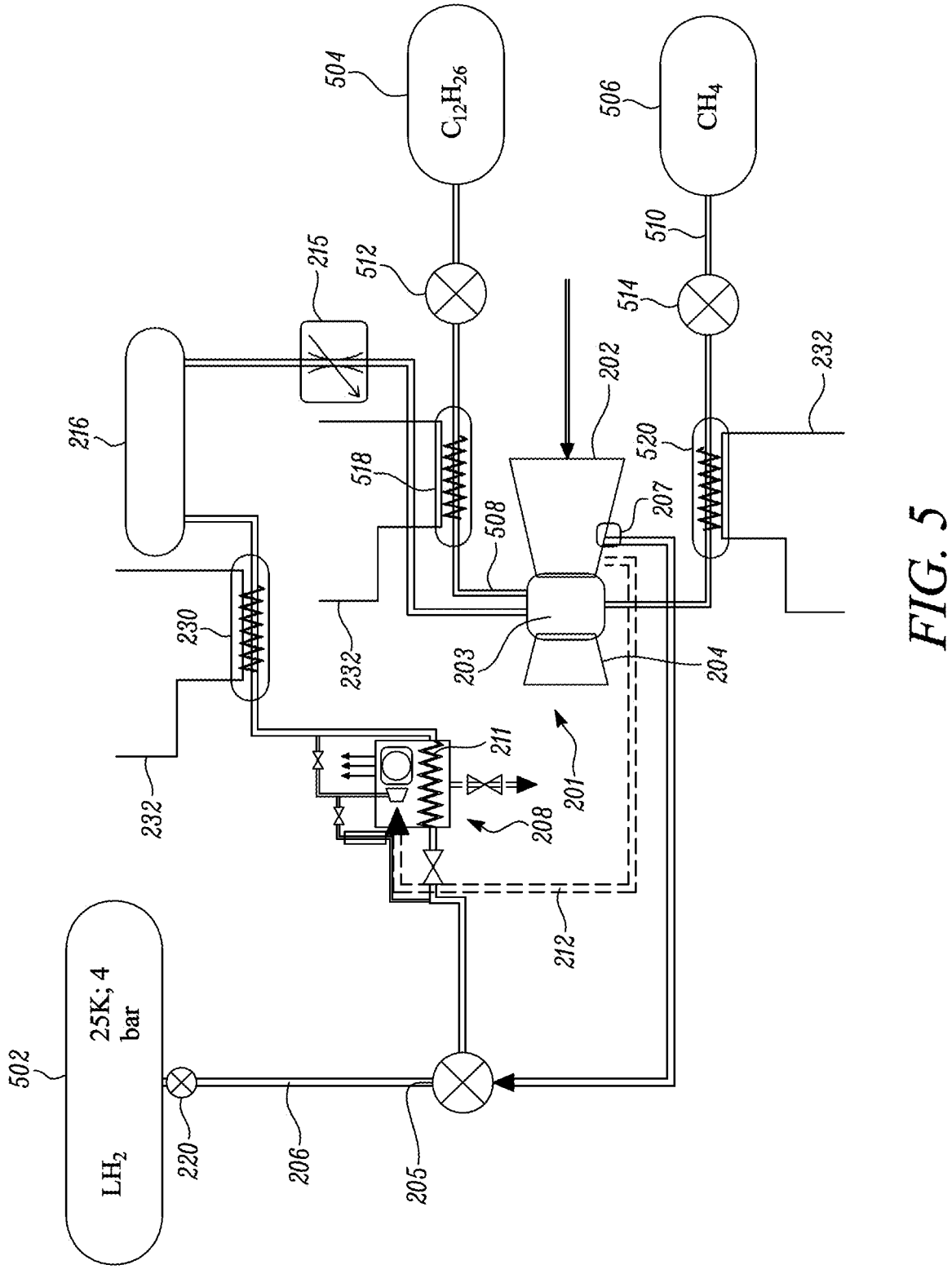
FIG. 5 is a block diagram of an alternative fuel system of the propulsion system of the aircraft of FIG. 1.
Figure 6:
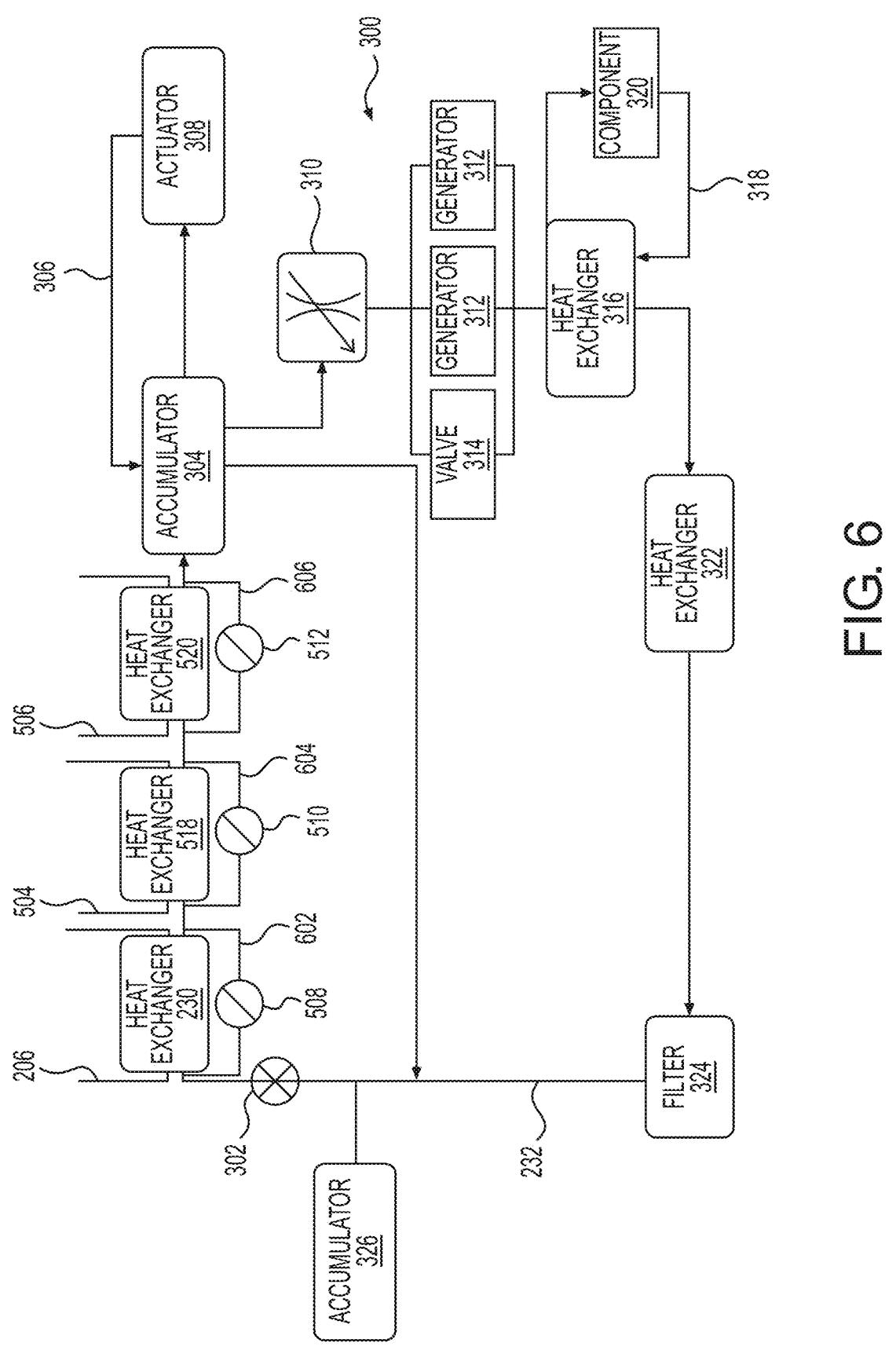
FIG. 6 is a block diagram of an alternative hydraulic system of the propulsion system of the aircraft of FIG. 1.

FIG. 5 shows an alternative embodiment of the fuel system for the propulsion system of FIG. 1. An alternative hydraulic system is shown in FIG. 6, which is compatible with the fuel system of FIG. 5 and forms a single embodiment.

In this embodiment, the system is configured to utilise one or more of a plurality of fuels, including at least hydrogen and one other fuel.

In this embodiment, the fuel system is configured to utilise a first fuel comprising hydrogen, a second fuel comprising kerosene, and a third fuel comprising methane. The kerosene fuel could comprise a mineral fuel such as Jet-A, or a non-mineral kerosene such as Sustainable Aviation Fuel (SAF). SAF includes fuel derived from plant derived oils, or "power to liquids" processes such as the Fischer-Tropsch process. Kerosene blends comprising mineral kerosene with SAF are also suitable. The methane could similarly comprise natural gas or synthetically derived methane, or a blend of the two. As will be understood, methane generally consists of relatively pure $CH_4$, while kerosene typically comprises a blend of hydrocarbons ranging from $C_{12}H_{26}$ to $C_{15}H_{32}$, blended with aromatic hydrocarbons.

In this embodiment, first, second and third fuel tanks 502, 504, 506 are provided, one for each fuel. The hydrogen fuel tank 502 is similar to the tank 104, and is configured to store cryogenically cooled hydrogen, either as a liquid or a gas. The kerosene tank 504 typically stores the kerosene as a liquid. Two or more kerosene tanks may be provided, such that different mixtures of mineral and SAF fuels can be provided in flight. Similarly, the methane tank 506 stores methane in either a compressed gaseous or a liquid form, typically, at cryogenic temperatures.

Each tank 502, 504, 506 is associated with a respective fuel conduit 206, 508, 510 configured to transmit the respective fuel from the respective fuel tank to the gas turbine engine core combustor 203. Similarly, respective first, second and third pumps 205, 512, 514 are provided for pressurising and driving each respective fuel. Further equipment (not shown) may be provided for each fuel system. For instance, a pre-heater (not shown) may be required for the methane fuel system. Various fuel filters, hydromechanical units and other equipment may be installed.

The hydrogen tank 502, pump 205 and fuel conduit 206 make up a first fuel system. Similarly, the kerosene tank 504, pump 512 and fuel conduit 508 make up a second fuel system. The methane tank 506, pump 514 and fuel conduit 510 make up a third fuel system. Each fuel system is separate, such that the first, second and third fuels do not mix, at least until entry to the core combustor 203.

Each fuel system further comprises a respective fuel to hydraulic fluid heat exchanger. The hydrogen fuel to hydraulic heat exchanger 230 is similar to that of the first embodiment. Similar kerosene 518 and methane 520 fuel to hydraulic fluid heat exchangers are provided. Each heat exchanger 230, 518, 520 is configured to exchange heat between a respective fuel in a respective fuel conduit 206, 508, 510 with hydraulic fluid in the hydraulic fluid conduit 232.

As will be appreciated, each fuel is associated with certain advantages and disadvantages in its use. Hydrogen fuel has no direct carbon dioxide emissions and may also have lower particulate and oxides of nitrogen (NOx) emissions. Lower particulate emissions are in turn associated with reduced formation of potentially environmentally damaging persistent contrails. As such, hydrogen is regarded as a less environmentally damaging, "green" fuel. However, hydrogen may not be available at all airports, which makes producing hydrogen aircraft transport networks challenging. Storage is also difficult, as hydrogen must be stored as a cryogenic liquid to obtain reasonable energy density. The relatively low volumetric energy density of hydrogen, even when stored as a liquid, also makes designing an aircraft with sufficient range challenging.

Kerosene is widely available and has a higher energy density than hydrogen. However, it is environmentally damaging when sourced from fossil reserves, and expensive when sourced from SAF feedstock.

Methane can be regarded as between the extremes of hydrogen and kerosene. Combustion products of methane are less environmentally damaging, in view of the lower ratio of carbon to hydrogen in methane molecules compared to kerosene. Methane also typically burns more "cleanly", with lower particulates emissions. Methane may also be less expensive than kerosene on a per Megajoule basis. Again however, storage is challenging, and availability is not widespread.

As such, it may be desirable to provide aircraft with a "dual-fuel" or "triple-fuel" architecture, in which one or both of methane and kerosene is utilised onboard the aircraft, in conjunction with hydrogen. As such, the aircraft can use whichever fuel is available and most desirable at each airport. In some cases, the fuel can be switched in flight, for example between hydrogen and kerosene, or hydrogen and methane, to extend range. In some cases, the engine may burn a blend of fuels simultaneously, such as hydrogen and methane, or hydrogen and kerosene, for instance to control emissions.

However, problems arise in such a system. Mixing of the fuels is generally impermissible, in view of the different materials properties and temperatures of the fuel. It would for example be highly undesirable to contaminate the hydrogen fuel system with kerosene or methane, in view of the low temperatures found in the hydrogen system. The hydrogen fuel system is also generally equipped to either operate with low temperature liquids or gases. At the temperatures at which hydrogen is a liquid, kerosene is a solid, and at the temperatures at which hydrogen is a gas, kerosene is either a solid or a liquid. As such, pumps and valves configured to operate on gaseous hydrogen would not be suitable for operation with kerosene. Similar issues arise with methane. As such, fuel systems which can operate with two of these fuels are difficult to construct, and require extensive redundancy of components. This results in increased cost and weight.

Further problems arise when there is a requirement for switching between fuels in flight. Both the engine and aircraft auxiliary systems must continue to operate during the switch-over, with temperatures and flow rates remaining stable. Such an in-flight fuel switch may be required for example in the event of a fuel system failure.

FIG. 6 shows a hydraulic system suitable for use with the fuel system of FIG. 5. As can be seen, the hydraulic side of each heat exchanger 230, 518, 520 is shown. The heat exchangers 230, 518, 520 are provided in series fluid flow with respect to the hydraulic fluid, with respective bypass passages 602, 604, 606 being provided, being configurable to selectively bypass each heat exchanger 230, 518, 520. Flow through each heat exchanger 230, 518, 520 is controlled by a respective bypass valve 508, 510, 512.

Accordingly, irrespective of which fuel is used, heat exchange between the hydraulic fluid and at least one fuel is available. This allows for both cooling of the hydraulic fluid and warming of the fuel as required. For instance, the methane fuel may require warming prior to delivery to the core combustor, particularly where the methane is stored as a liquid at relatively low pressures.

The fuel system and hydraulic systems may be operated in a different manner depending on the selected fuel.

In a first operating method, hydrogen fuel is selected. The hydrogen fuel system is operated in accordance with the first embodiment, with hydrogen fuel being flowed from the tank 104, though the conduit 206 and pre-heater 208 and heat exchanger 230, to the core combustor 203. On the hydraulic system side, the hydraulic system is operated with the hydraulic fluid being pumped around the main hydraulic fluid conduit 232 by the hydraulic pump 302. The hydraulic fluid may be pumped through each of the heat exchangers 230, 518, 520 in series, with the bypass valves 508, 510, 512 being closed. However, due to the lack of fuel flow in either the kerosene or methane heat exchangers 518, 520, heat exchange only substantially takes place in the hydrogen heat exchanger 230. As such, temperature control can be varied in accordance with hydraulic fluid and hydrogen fuel flow rates.

In a second operating method, kerosene fuel is selected. This may be conducted prior to flight, or during flight, for example in an emergency due to a hydrogen fuel system failure. In this case, the hydrogen pump 205 is de-powered, and the kerosene pump 512 is actuated. Since hydrogen is no longer flowing through the hydrogen heat exchanger 230, and kerosene is now flowing through the kerosene heat exchanger 518. As such, heat exchange takes place between the hydraulic fluid and kerosene fuel, but not between hydraulic fluid and hydrogen fuel. Accordingly, hydraulic fluid temperature remains controlled by the fuel supply, without any positive intervention in the hydraulic system. No valve actuations are required, since the hydraulic fluid is already flowing through each of the heat exchangers 230, 518, 520 in series. As such, a robust fail-safe arrangement is provided, in which hydraulic system and engine oil system cooling is provided prior to, during, and subsequent to fuel switching, without requiring additional actuation of hydraulic system.

Similarly, the system can be operated in accordance with a third method in which methane fuel is selected. In this case, both the hydrogen and kerosene pumps 205, 512 are shut down, and the methane pump 514 is actuated. Again, heat exchange occurs between the methane fuel and hydraulic fluid via the methane heat exchanger 520 and ceases between the hydraulic fluid and the other fuels.

In further operating methods, a combination of fuels can be utilised simultaneously. In one example, hydrogen fuel and kerosene fuel are supplied to the engine simultaneously. In such a case, both the hydrogen pump 205 and the kerosene pump 512 are actuated, with heat exchange taking place between the hydraulic fluid and both fuels in the hydrogen and kerosene heat exchangers 230, 518.

In this case, it may be desirable to control flow through each heat exchanger 230, 518 via the valves 508, 510 to avoid overcooling of the hydraulic fluid, or insufficient heating of the hydrogen fuel. Accordingly, the valve 510 may be partially opened for example, to reduce heat exchanger 518 flow.

Various examples have been described, each of which comprise various combinations of features. It will be appreciated by those skilled in the art that, except where clearly mutually exclusive, any of the features may be employed separately or in combination with any other features and thus the disclosed subject-matter extends to and includes all such combinations and sub-combinations of the or more features described herein.

For example, the system may be dual-fuel rather than triple-fuel, in which the second fuel may comprise either kerosene or methane. In such an embodiment, the system would comprise only a hydrogen heat exchanger and kerosene/methane heat exchanger, with third fuel heat exchanger being omitted.

Changes may be made to the disclosed embodiment without departing from the invention as defined by the claims. For example, the pre-heater may be omitted, or replaced with a pre-heater that does not require compressed air to operate, such as an electrical heater or a recuperator. Similarly, the gas turbine engine could be of a different form, and could comprise two or even three shafts, with associated compressors and turbines. Examples include turboprop engines, turbojet engines, and hybrid electric gas turbine engines. Similarly, the aircraft could be of a different configuration. Options include aircraft with rear-fuselage mounted engines, and blended wing-body aircraft.

The invention claimed is:

1. A hydraulic system for a hydrogen fueled gas turbine engine, the hydraulic system comprising:
   a closed-loop hydraulic fluid conduit;
   a hydrogen-hydraulic fluid heat exchanger configured to exchange heat between cryogenic hydrogen fuel and hydraulic fluid within the hydraulic fluid conduit;
   a second fuel-hydraulic heat exchanger configured to exchange heat between a second, non-hydrogen fuel and hydraulic fluid in the hydraulic fluid conduit;
   a hydrogen fuel circuit configured to flow the hydrogen fuel through the hydrogen-hydraulic fluid heat exchanger but not the second fuel-hydraulic heat exchanger; and
   a second fuel circuit configured to flow the non-hydrogen fuel through the second fuel-hydraulic heat exchanger but not the hydrogen-hydraulic fluid heat exchanger.

2. A hydraulic system according to claim 1, wherein the hydraulic system comprises a third fuel-hydraulic heat exchanger configured to exchange heat between a third, non-hydrogen fuel and hydraulic fluid in the hydraulic fluid conduit.

3. A hydraulic system according to claim 1, wherein the second and/or third fuel comprises kerosene and/or methane.

4. A hydraulic system according to claim 1, wherein the hydrogen-hydraulic fluid heat exchanger and second fuel-hydraulic and optional third fuel-hydraulic heat exchangers are provided in hydraulic fluid flow series.

5. A hydraulic system according to claim 1, wherein the hydraulic system comprises first and/or second fuel-hydraulic bypass lines configured to selectively bypass a respective fuel-hydraulic heat exchanger.

6. A hydraulic system according to claim 1, wherein the hydraulic system comprises a further heat exchanger configured to exchange heat between the hydraulic fluid and one or more further engine fluids.

7. A system according to claim 1, wherein the hydraulic system comprises a hydraulic pump configured to pressurise and drive hydraulic fluid flow through the hydraulic fluid conduit.

8. A system according to claim 7, wherein the hydraulic pump is provided upstream in fluid flow of the hydrogen-hydraulic fluid heat exchanger.

9. A system according to claim 8, wherein the hydraulic pump is configured to provide a total hydraulic fluid pressure within the hydrogen-hydraulic fluid heat exchanger equal to or greater than a hydrogen fuel pressure within the hydrogen-hydraulic fluid heat exchanger.

10. A system according to claim 1, wherein the hydraulic system comprises one or more hydraulically actuated actuators.

11. A system according to claim 6, wherein the hydraulic system comprises a restrictor downstream in hydraulic fluid flow of the hydrogen-hydraulic fluid heat exchanger, and upstream of the further heat exchanger.

12. A system according to claim 11, wherein the restrictor is upstream of one or more components cooled by hydraulic fluid.

13. A system according to claim 12, wherein the hydraulic system comprises a high-pressure sub-loop upstream of the restrictor and configured to provide hydraulic actuation fluid to one or more hydraulic actuators.

14. A system according to claim 12, wherein the hydraulic system comprises a high-pressure hydraulic accumulator configured to provide hydraulic fluid to the high-pressure sub-loop and to the restrictor.

15. A system according to claim 6, wherein the further heat exchanger is configured to exchange heat between hydraulic fluid and oil.

16. A gas turbine engine comprising a hydraulic system in accordance with claim 1.

* * * * *